United States Patent Office 3,087,784
Patented Apr. 30, 1963

3,087,784
MANUFACTURE OF DEFLUORINATED PHOSPHATES
John D. Nickerson, Lakeland, Fla., assignor to International Minerals & Chemical Corporation, a corporation of New York
No Drawing. Filed Dec. 8, 1959, Ser. No. 858,060
9 Claims. (Cl. 23—108)

The present invention generally relates to the manufacture of defluorinated phosphates. More particularly, it relates to the manufacture of defluorinated phosphates useful as animal feed or animal feed supplement, although the defluorinated phosphates may also be used as fertilizer or plant food.

Mineral phosphates of all of the commercially exploited natural deposits in the United States and in most foreign countries occur in the form of apatite. Apatite is a phosphate of lime containing varying amounts of chlorine, fluorine, and hydroxyl. It is generally represented by the formula $Ca_5(F \cdot Cl \cdot OH)(PO_4)_3$. The phosphorus pentoxide content varies from 41 to 42%. The fluorine content may reach as high as 3.8% or higher, and is generally about 3.3%. Because of the serious detrimental effects caused by continued feeding of significant amounts of fluorine to animals, particularly cattle, it is generally necessary to reduce the fluorine content of phosphate rock and of phosphatic materials made from phosphate rock so that the phosphorus to fluorine ratio, P/F, is greater than 100/1 before it is suitable for use as an animal feed.

The availability of the phosphate is also an important factor when the phosphate is used as an animal feed. By availability as used herein is meant that the phosphate is in the orthophosphat form or an equivalent state such as is found in betatricalcium phosphate, in which state the phosphate can best be assimilated by an animal. For animal feed, the phosphate is preferably substantially 100% in the ortho form, as determined by solubility in 0.4% HCl. Moreover, chick feeding tests have shown that 80% or more of the phosphate should be soluble in neutral ammonium citrate.

Accordingly, it is an object of the present invention to provide a process for manufacturing a phosphate product of low fluorine content.

It is another object of the present invention to provide an animal feed ingredient meeting the industry's requirement for a product having a P/F weight ratio greater than 100.

A specific object of the present invention is to provide a process for manufacturing an animal feed ingredient from phosphate rock, sulfuric acid, phosphoric acid and elemental silicon.

These and other objects and advantages of the present invention will become apparent as the description of the present invention progresses.

In accordance with the present invention, phosphatic material containing fluorine is mixed with elemental silicon and the mixture is calcined to drive off fluorine. In another embodiment of the invention, a mixture is first prepared by mixing phosphate rock with sulfuric acid and/or phosphoric acid. Elemental silicon is added to and mixed with the mixture, and then calcined to drive off fluorine.

The instant process offers an economical and novel method of obtaining an improved animal feed supplement. The process in its preferred embodiment entails the intimate mixing of finely divided solid phosphatic material and elemental silicon. Other materials may, of course, be included in the mixture such as, for example, phosphoric acid, sulfuric acid, lime, limestone, soda ash, etc.

The fluorine containing phosphatic material, which has a P/F weight ratio less than 100/1 and more generally less than 10/1, is preferably in finely divided form, generally less than 1 mm. size. The fluorine-containing phosphatic material is preferably phosphate rock, superphosphate, triple superphosphate or mixtures thereof. These phosphatic materials generally contain more than 1.0% by weight of fluorine. The phosphate rock is best utilized when it is finely ground so that from about 40% to about 80% is capable of passing through a 100 mesh screen. Less finely divided material may, however, be used.

The silicon is also used in relatively finely divided solid form, preferably in powder form. Substantially pure elemental silicon is preferably used. Silicon alloys such as, for example, aluminum-silicon alloy, ferrosilicon, etc. may also be used. The presence of elemental silicon in the calcination step greatly increases the amount of fluorine driven off during the calcination, thereby producing a product of higher P/F than would be obtained under the same calcining conditions in the absence of elemental silicon.

The silicon is present in the mix in minor proportions to effect a substantial degree of defluorination of the phosphatic materials. The amount of silicon added is dictated, inter alia, by the amount of defluorination to be effected. It is preferred that elemental silicon be present in an amount of at least 0.01% by weight of the phosphatic material introduced into the calciner. The amount of elemental silicon will usually be within the range of from about 0.01% to about 5% and preferably within the range of from about 0.05% to about 3% by weight of the phosphatic material. Amounts in excess of that necessary to achieve the desired degree of defluorination are, of course, economically impractical.

A mole ratio balancing salt selected from volatile anion salts of alkali metals may also be added to the phosphatic material before the calcination step. The addition of a volatile anion salt of an alkali metal, preferably in a proportion to give an alkali metal to $P_2O_5$ mole ratio between about 0.05:1 and about 0.6:1, also has a marked effect upon the defluorination of the mixture. For mixtures of the same calculated mole ratio of ingredients calcined with the same water vapor content in the calcining gases, increase in alkali metal salt content reduces the fluorine content of the product. The alkali metal oxide to $P_2O_5$ mole ratio also has a marked effect on the citrate solubility of the $P_2O_5$ content of the product. Products of the same calculated mole ratio show a markedly increased percentage in the total $P_2O_5$ which is citrate soluble when the alkali metal to $P_2O_5$ mole ratio is increased.

Any suitable volatile anion alkali metal salt may be added to the mix and specific salts are soda ash (sodium carbonate), sodium sulfate, sodium nitrate, sodium formate, sodium chloride, potassium carbonate, potassium sulfate, potassium nitrate, potassium formate, potassium chloride, and the like. Lithium, rubidium and cesium salts having volatile anions may also be used. Soda ash is particularly preferred because of its ready availability and low cost and because its use produces good results.

The phosphatic material, elemental silicon, and, when used, the mole ratio balancing salt, are intimately mixed in suitable mixing apparatus and may then directly be calcined. However, after the ingredients are thoroughly mixed, the mixture may be sprayed with water to form granules. It is preferable to add sufficient water so as to obtain a mixture having from about 5% to about 15% by weight of water. The water is preferably sprayed onto the mixture while it is being mixed in suitable granulating apparatus so as to form granules of the desired size. Ordinarily, this type of granulation process is carried out in apparatus which comprises a rotary drum in which the particles are agglomerated. When granulation is employed, the product from the granulating step is preferably sized and the particles in the desired size range are recovered while oversize and undersize particles are recycled to the granulator. For most animal feeds, the desired range of particle size is from 6 mesh to 35 mesh (—6 +35 mesh), Tyler series.

The mixture of phosphatic material, elemental silicon, and, when employed, mole ratio balancing salt, with or without granulation, is fed to a calciner, such as, for example, a rotary kiln, for a calcination treatment. In a calcination treatment in a rotary kiln, the mixture is subjected to a tumbling action in which solids and gases can pass concurrently, but preferably pass in counter-current flow. The calciner may be of the direct heating type wherein the hot combustion gases and the flame of the burner are directed into the product discharge end of the kiln or the calciner may be of the indirect heating type. The gaseous atmosphere which is in contact with the mixture in the kiln preferably contains water vapor which aids materially in the defluorination.

The presence of water vapor has also been found to be important to the citrate solubility of the product. It is preferred that from about 5 mole percent to about 30 mole percent of water vapor be present in the calcining gases. Such an atmosphere may be created by injection of steam or water into the flame end of the calciner or by use of a fuel of sufficient hydrogen content so as to produce the desired water vapor content in the combustion products. Defluorination during calcination is also enhanced by the sweeping action of gases passing over and through the comminuted solids.

The calcining temperature is preferably above 700° F. and preferably is also below the fusion point of the material being calcined; however, fusion of the mixture may be effected if desired. The temperature is more preferably above 1000° F. and a specifically preferred temperature range is from about 2400° F. to about 2600° F. In general, the temperature of the calcining operation and the period of time the phosphatic material is at the calcination temperature are dependent variables with longer periods of time being required at lower temperatures to achieve the same P/F. Or, conversely, at higher temperatures shorter periods of time are required to achieve the same P/F. The time period is usually more than 5 minutes and less than 2 hours. It is preferable that no substantial amount of fusion be permitted to occur during the calcining operation and accordingly the material is preferably heated at temperatures below the fusion point. During the calcining, fluorine is driven off from the phosphate material so as to render it acceptable as an animal feed ingredient. The operating conditions of the calciner and the make-up of the calciner feed are preferably correlated to achieve a P/F of greater than 100/1 in the product.

The solid material removed from the calciner may be subjected to a rapid cooling or quenching. This cooling or quenching should rapidly reduce the material to a temperature of below 900° F., and more preferably of 600° F. or below. The quenching of the calcined material may be accomplished in any suitable manner. One method is to direct a stream of the calciner effluent material into a large body of water. Another method of quenching is to direct a jet or plurality of jets of water into the stream of material being discharged from the calciner. The quenched material is then dried and may be packaged as the product of the process, with or without further treatment.

The process will be more fully understood from the following examples which are given by way of illustration and without any intention of the invention being limited thereto.

EXAMPLE I

A phosphatic material was prepared by mixing 100 grams of 77% BPL (bone phosphate of lime) Florida pebble phosphate rock, 60 grams of 78% sulfuric acid and 32 grams of wet process phosphoric acid of 24% $P_2O_5$ concentration. The mixture was cured for 24 hours at room temperature, dried for two hours at 230° F. and crushed to —65 mesh. A plurality of defluorination tests, in accordance with the present invention, were then conducted in which approximately 25 gram samples of this phosphatic material were mixed with finely divided, powdery silicon metal. The ratio of silicon metal to the phosphate rock was varied as indicated below in Table 1. The mixtures of silicon and phosphatic material were calcined in a furnace at 2500° F. for 30 minutes. Furnace atmosphere was provided by 10 liters of air per minute and 2–3 grams of $H_2O$ per minute as steam. In each test, the calcined mixture was water quenched to lower the temperature rapidly to below 300° F. The P/F weight ratios in the product are given below in Table 1.

*Table 1*

| Silicon content in lbs./ton of phosphate rock: | P/F weight ratio in product |
|---|---|
| 0.0 | 428 |
| 6.5 | 1,420 |
| 26.0 | 4,460 |

This example illustrates that the addition of silicon metal to the calciner feed substantially increases the amount of fluorine removed in the calcination.

EXAMPLE II

Additional samples of the —65 mesh mixture prepared in Example I were calcined at various temperatures for 30 minutes, with and without the addition of silicon metal. Except as noted, the calcining conditions were substantially the same as for the tests in Example I. The results are given below in Table 2.

*Table 2*

| Temperature, ° F. | No Silicon, P/F Weight Ratio in Product | 26 lbs. Silicon/Ton Phosphate Rock, P/F Weight Ratio in Product |
|---|---|---|
| 2,500 | 429 | 4,460 |
| 2,400 | 37 | 68 |
| 2,300 | 35 | 39 |

EXAMPLE III

Additional samples of the —65 mesh mixture prepared in Example I were calcined at 2500° F. for various time intervals, with and without the addition of silicon metal. Except as noted, the calcining conditions were substantially the same as for the tests in Example II. The results are given below in Table 3.

*Table 3*

| Time in Minutes | No Silicon, P/F Weight Ratio in Product | 26 lbs. Silicon/Ton of Phosphate Rock, P/F Weight Ratio in Product |
|---|---|---|
| 20 | 81 | 94 |
| 25 | 248 | 686 |
| 30 | 429 | 4,460 |

EXAMPLE IV

In order to illustrate that the use of silicon is not equivalent to the use of silica, samples of a —65 mesh phosphatic material prepared in a manner similar to the mixture of Example I were calcined at 2500° F. In one test (control P/F), on siliceous material was added to the mix. In another test, precipitated silica in the amount of 80 lbs./ton of phosphate rock was added. In a third test, potter's flint in the amount of 80 lbs./ton of phosphate rock was added. Except as noted, the calcining conditions were substantially the same as for the tests in Example I. The results are given below in Table 4.

Table 4

| Control P/F (No Silica Added) | Precipitated Silica, P/F | Potter's Flint P/F |
|---|---|---|
| 48 | 91 | 100 |

The use of 80 pounds of precipitated silica, which is equivalent to 46.7 pounds of Si per ton of phosphate rock, therefore, did not quite double the P/F ratio, specifically from 48 to 91. However, as is illustrated in Example I, the use of elemental silicon in the amount of only 26 pounds per ton of phosphate rock increased the P/F ratio more than tenfold, specifically from 428 to 4,460.

The description of the invention utilizes specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims:

1. A process for the manufacture of defluorinated phosphates which comprises mixing a phosphatic material containing at least 1.0% by weight of fluorine with elemental silicon in an amount of at least 0.01% by weight of the phosphatic material, calcining the mixture at a temperature above 700° F. to drive off the fluorine from the phosphatic material, and recovering a phosphatic material of substantially reduced fluorine content suitable for use in the manufacture of animal feeds.

2. The process according to claim 1 wherein said phosphatic material containing fluorine comprises triple superphosphate containing at least 1.0% by weight of fluorine.

3. The process according to claim 1 wherein said phosphatic material containing fluorine comprises superphosphate containing at least 1.0% by weight of fluorine.

4. The process according to claim 1 wherein said phosphatic material containing fluorine comprises phosphate rock containing at least 1.0% by weight of fluorine.

5. A process for the manufacture of defluorinated phosphates having a P/F ratio of at least 100 which comprises mixing a phosphatic material containing fluorine with from about 0.01% to about 5% by weight of elemental silicon, calcining the mixture at a temperature above 1000° F. and below the fusion point of the phosphatic material to drive off fluorine and thereby produce a defluorinated phosphate having a P/F ratio of at least 100 and recovering said phosphate of reduced fluorine content.

6. A process for the manufacture of defluorinated phosphates having a P/F ratio of at least 100 which comprises mixing a phosphatic material containing fluorine with from about 0.01% to about 5% by weight of elemental silicon, calcining the mixture at a temperature within the range of from about 2400° F. to about 2600° F. for at least five minutes to drive off fluorine, quenching the calcined product to thereby produce a defluorinated phosphate having a P/F ratio of at least 100 and recovering said phosphate of reduced fluorine content.

7. The process according to claim 5 wherein said phosphatic material containing fluorine comprises triple superphosphate containing at least 1.0% by weight of fluorine.

8. The process according to claim 5 wherein said phosphatic material containing fluorine comprises superphosphate containing at least 1.0% by weight of fluorine.

9. The process according to claim 5 wherein said phosphatic material containing fluorine comprises phosphate rock containing at least 1.0% by weight of fluorine.

References Cited in the file of this patent

UNITED STATES PATENTS

| 2,044,774 | Curtis | June 23, 1936 |
| 2,446,978 | Maust | Aug. 10, 1948 |
| 2,473,703 | Colton et al. | June 21, 1949 |